United States Patent [19]

Stevenson et al.

[11] 4,081,851
[45] Mar. 28, 1978

[54] LIGHTENING PROTECTION CIRCUIT

[75] Inventors: Robert Van Ness Stevenson; Courtland L. Robertson, both of Owensboro, Ky.

[73] Assignees: Southwire Company, Carrollton, Ga.; National Steel Corporation, Pittsburgh, Pa.

[21] Appl. No.: 660,972

[22] Filed: Feb. 24, 1976

[51] Int. Cl.² .............................................. H02H 7/00
[52] U.S. Cl. ................................................... 361/42
[58] Field of Search ................. 317/18 A, 18 B, 18 D, 317/18 R, 31, 61, 71; 340/255, 256; 361/42

[56] References Cited
U.S. PATENT DOCUMENTS

| 2,700,125 | 1/1955 | King et al. | 340/255 X |
| 3,631,321 | 12/1971 | Eisenstadt | 317/18 R |
| 3,676,738 | 7/1972 | Scanlan | 317/18 R |
| 3,678,338 | 7/1972 | Beachley | 317/18 R |
| 3,950,742 | 4/1976 | MacMartin et al. | 317/18 R |

Primary Examiner—A. D. Pellinen

Attorney, Agent, or Firm—Herbert M. Hanegan; Stanley L. Tate; Robert Steven Linne

[57] ABSTRACT

A lightning protection circuit involves the grounding of the neutral center point of a direct current circuit carrying current to electrolytic reduction cells in a pot room of an aluminum reduction plant. The grounding is accomplished to earth ground via buried grounding rods which are connected to the center point via an interruptible grounding circuit. A safety circuit arrangement is provided which is responsive to direct current and effects the opening of the grounding circuit whenever the current in the grounding circuit exceeds a predetermined value. The safety circuit arrangement also involves a voltage sensing path responsive to the magnitude of the voltage between plant ground and the center point of the direct current circuit which effects an interruption of the grounding circuit whenever this voltage exceeds a predetermined value in either the positive or negative direction. The grounding circuit may also be interrupted whenever direct current between plant ground and the center point through the voltage sensing path exceeds a given value.

6 Claims, 1 Drawing Figure

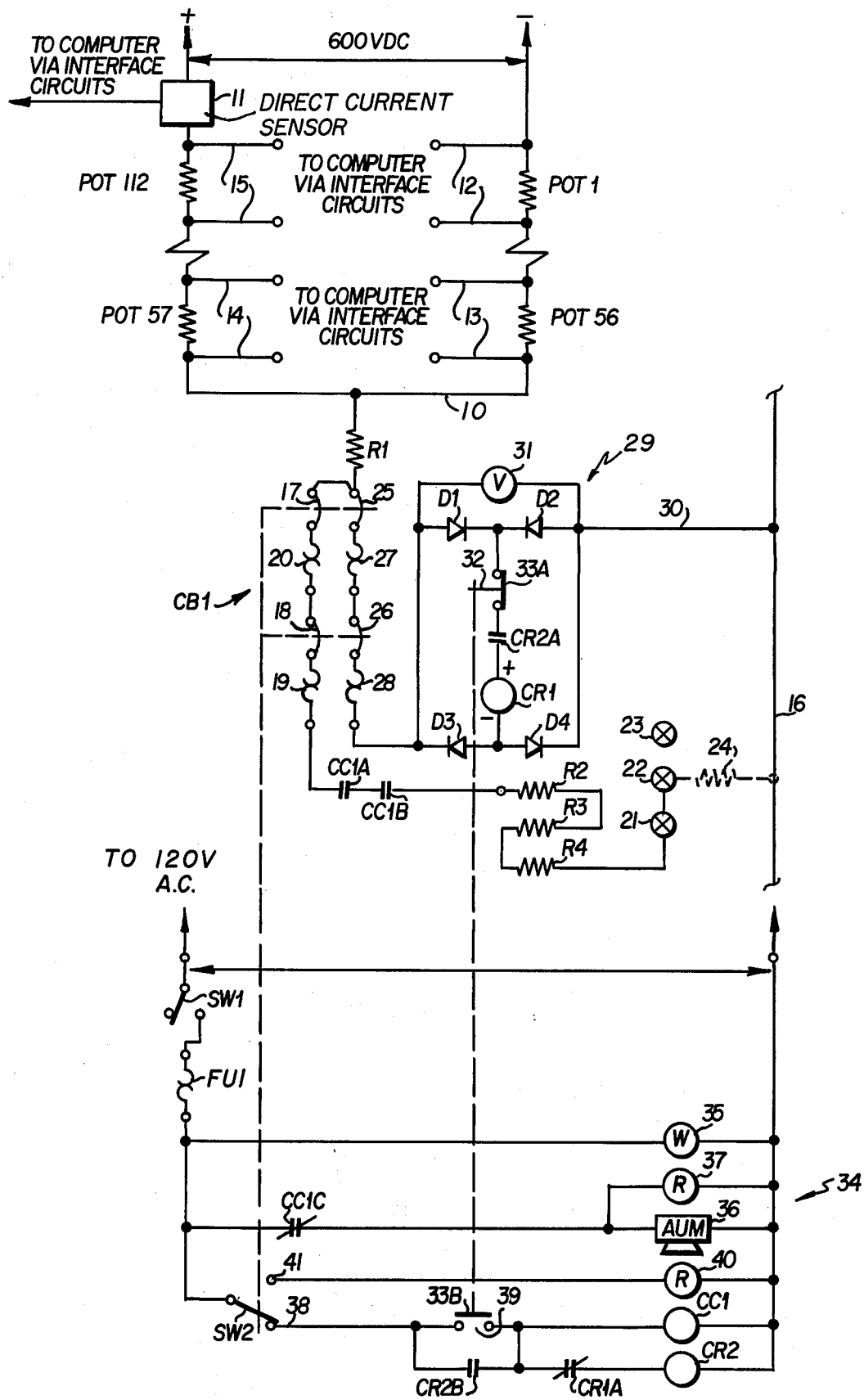

LIGHTENING PROTECTION CIRCUIT

BACKGROUND OF THE INVENTION

This invention relates to a lightning protection circuit particularly useful in processing plants for the production of aluminum and the like. The invention relates, more particularly, to a lightning protection circuit which involves the grounding of the neutral, center point of a direct current circuit in a processing plant and in preferred forms, to such a circuit in combination with safety circuits for the interruption of the grounding connection.

The production of aluminum by electrolysis of aluminum containing compounds is a very old and well known process. Commercial aluminum production may be carried out by the Hall-Heroult process in which aluminum oxide refined from bauxite ore is reduced electrolytically. Alumina, $Al_2O_3$, the solute, is dissolved in molten cryolite, $NaF/AlF_3$, the solvent, at a temperature of about 970° C. The dissolved alumina, when subjected to a high intensity direct current in electrolytic cells, disassociates into positive aluminum and negative oxygen ions. In practice, a plurality of substantially identically constructed electrolytic reduction cells, for example, 112 cells are arranged in a pot line. That is, they are connected electrically in series. A direct current of from about 50,000 amperes to about 160,000 amperes or more, in commercial reduction systems, is not unusual. The electric path from the external direct current source, for example, a 600 volt source, is composed of the electrolytic bath within each cell, the cathode and anode structures thereof, conductive connections to these electrode structures and current buses which connect one cell to the next. The electrode structures and the baths exhibit a resistance through which the very high direct current of several thousand amperes flows. In practice, approximately a five volt D. C. voltage drop appears across each cell.

It has been determined that with no circuit connection from the direct current carrying circuit to earth ground, it was possible during electrical storm activity to build up static charges to a very high potential above earth ground in the power buses and cells. The build-up of the high potential static charges posed a distinct danger of arcing, with the possibility of danger to persons working in the pot room, to a computer used to control automatically the feeding of alumina to the reduction cells and to interface circuits which interconnect the direct current circuits to the computer.

Of the many possible problems encountered in a pot room in which an intentional earth ground connection can be used to provide some measure of lightning protection, two special problems have been encountered. The first of these problems is the occurrence of an accidental ground at a second point on the direct current power circuit. Unless the intentional ground is removed, large, undesirable ground currents will flow, depending on the location of the accidental ground. The second special problem encountered concerns the safety of personnel. If a person working in the pot room should become involved in an accidental connection to ground with the equipment he may be handling or through his person, the direct potential at that point of the direct current power system with which the person or his equipment is in contact would remain high; unless the intentional ground connection were removed. In this case, the floating neutral point would move to the accidentally grounded point thereby reducing the danger to the person working in the pot room.

SUMMARY OF THE INVENTION

It is the principal object of the present invention to provide an earth grounding circuit for providing lightning protection in a processing facility having a direct current power system.

It is a further object of the present invention to provide a lightning protection, earth grounding circuit which can be opened automatically upon the occurrence of a current flow in excess of a given magnitude between plant ground and a normally neutral point on the direct current power system.

It is another object of the present invention to provide a lightning protection, earth grounding circuit which can be automatically opened upon the occurrence of ground current in excess of a predetermined magnitude.

It is an additional object of the present invention to provide a lightning protection, earth grounding circuit which can be interrupted automatically upon the occurrence of a potential in excess of a predetermined magnitude between plant ground and a point on the direct current power system.

It is yet another object of the present invention to provide a lightning protection, earth grounding circuit which includes safety features for protecting personnel and equipment.

It is yet a further object of the present invention to provide a lightning protection, earth grounding circuit which can be opened automatically upon the occurrence of an accidental connection to plant ground or to earth ground from a point on the direct current power system removed from the intentionally grounded point of the system.

In its broadest aspect, the present invention accomplishes the principal object by providing a lightning protection, earth grounding circuit for a processing facility having a direct current power system. The circuit includes a floating neutral point in the direct current power system and at least one grounding rod electrically and mechanically connected to earth ground. A series circuit connects the grounding rod or rods to the floating neutral point for effecting leaking to earth of static charges which may build up to high potentials during electrical storm conditions and the like.

In a preferred form of the present invention, the series circuit between the earth ground and the floating neutral point includes a circuit breaker responsive to current flow in this series circuit which effects its opening upon the occurrence therein of current in excess of a predetermined magnitude.

In a more detailed variant of the present invention, which can be used either in conjunction with the preferred form mentioned above or with the invention in its broadest aspect, a voltage responsive circuit is connected between the floating neutral point and facility ground to effect the opening of series circuit to earth ground upon the occurrence of a voltage between facility ground and the floating neutral point in excess of a predetermined magnitude.

A modification of the variant of the present invention mentioned above includes a circuit breaker which effects the opening of the series circuit between the floating neutral point and earth ground upon the occurrence of a current in excess of a given magnitude between the facility ground and the floating neutral point.

The processing facility in each case may be an aluminum reduction plant and the floating neutral point may be a connection to a bus connected between two electrolytic reduction cells of a series connected pot line, the connection being made so that an equal number of cells are connected between the point and respective poles of the direct current supply source.

BRIEF DESCRIPTION OF THE DRAWINGS

The sole FIGURE of drawing is a partially schematic wiring diagram of the lightning protection circuit according to the present invention, shown in conjunction with a diagrammatically illustrated plant ground grid and a schematically illustrated pot line.

DETAILED DESCRIPTION OF THE PREFERRED EMBODIMENT

Referring to the drawing, an electrolytic reduction cell pot line composed of the 112 electrolytic cells connected in series with one another across a 600 volt direct current power supply form part of an aluminum production facility, only four of the reduction cells with their electrode structures and electrode lead members being illustrated respectively as resistances POT 1, POT 56, POT 57 and POT 112. One end of the resistance POT 57 is connected via a tie bus 10 to an end of the resistance POT 56. It is to be understood that the electrolytic cells are connected in series one to the next by similar tie buses. An equal number of reduction cells are connected between the tie bus 10 and respective terminals of the 600 volt direct current power supply. The tie bus 10 is consequently electrically midway between the terminals of the 600 volt direct current power supply and constitutes a floating neutral point of the direct current power system, assuming that no accidental grounds on the direct current power system exist and the electrolytic cell load is balanced. Thus, theoretically the tie bus 10 between the resistances POT 57 and POT 56 would exhibit a zero volt potential with respect to ground. The aluminum production facility is provided with a computer (not shown) and conventional interface circuits (not shown) which couple points on the pot line to the computer which controls the feeding of alumina to the electrolytic reduction cells and performs other control functions. An example of a computer controlled aluminum production facility can be seen in the U.S. Pat. No. 3,878,070 to Joseph A. Murphy entitled, "Apparatus for and Method of Producing Metal," granted Apr. 15, 1975.

A direct current sensor 11 is connected in series with the pot line. Each of the resistance POT 1, POT 56, POT 57 and POT 112, have a respective pair of leads 12, 13, 14 and 15 connected. The pairs of leads 12-15 and an output from the current sensor 11 are coupled to the computer via its associated interface circuits. The aluminum production facility is provided with a plant ground grid 16 which is buried in the earth.

As thus far described, the aluminum production facility is of conventional construction. It is to be appreciated that were no earth ground connection made to the above described pot line in accordance with the present invention, extremely high potential static charges could build up in the direct current supply circuit, especially during electrical storms. Arcing could occur, personnel would be placed in possible danger and equipment, including the computer and its associated interface circuits, could be damaged.

In accordance with the present invention, the tie bus 10 is connected to earth ground via a series circuit constituted by a first 1 ohm, buffering resistor R1, contacts 17 and 18 of a circuit breaker CB1, its associated overload activators 19 and 20 operative at 1.75 ampere level, two contacts CC1A and CC1B of an alternating current relay CC1, three series connected, 5 ohm resistors R2, R3 and R4 to three grounding rods 21, 22 and 23 driven into the earth and constituting the earth ground. It is to be appreciated that as many grounding rods are provided as may be desired. The intentional ground connection is made in accordance with the present invention to the electrically floating neutral point constituted by the tie bus 10 which connects the resistance POT 57 to the resistance POT 56.

The processing facility, which is illustrated as an aluminum reduction plant, includes the plant ground grid 16 buried in the earth, thus an effective earth resistance 24 exists between the earth grounding rods 21-23 and the plant ground grid 16. If the direct current flowing in the series circuit between the tie bus 10 and the grounding rods 21-23 should raise above the predetermined 1.75 ampere level due to the electrical storm activity or some other malfunction of the system, the overload activators 19 and 20 open the circuit breaker CB1 thereby interrupting the earth ground connection to the tie bus 10.

The circuit breaker CB1 is provided with two series connected additional contacts 25 and 26 associated respectively with series connected, 0.8 ampere activators 27 and 28. The contacts 25, 26 and the activators 27 and 28 are connected in series with the buffer resistor R1 to the tie bus 10. The free end of the activator 28 is connected to the plant ground grid 16 via a voltage responsive circuit 29.

The voltage sensing path is from the floating neutral point constituted by the tie bus 10, through the resistor R1, the contact 25, the overload activator 27, the contact 26 and the overload activator 28, either a diode D1 or D3 (depending on polarity of voltage), a relay contact CR2A, a direct current relay CR1, either a diode D2 or D4 (depending on polarity of voltage) and a connection 30 to the plant ground grid 16. A direct current voltmeter 31 is connected across the series connected diodes D1 and D2 which have their respective cathodes connected to one another and their respective anodes connected respectively to the respective cathodes of the diodes D3 and D4 which have their anodes connected to one another. The relay contact CR2A and the direct current relay CR1 are connected, in series with one another and contacts 32 of a reset button bar 33A between the cathodes of the diodes D3 and D4 and the anodes of the diodes D1 and D2. Whenever the current between the plant ground grid 16 and the tie bus 10 exceeds a given level of 0.8 amperes, the overload activators 27 and 28 effect the opening of the contacts 25 and 26 of the circuit breaker CB1 thereby interrupting the intentional grounding circuit between the tie bus 10 and the grounding rods 21-23, because of the fact that the contacts 25 and 26 are mechanically connected to contacts 17 and 18. The opening of the contacts 25 and 26 also open the voltage sensing path between the resistor R1 and the voltage responsive circuit 29.

The relay contact CR2A is associated with an alternating current relay CR2 which, like the alternating current relay CC1, forms part of a control and indicating circuit generally designated by the numeral 34. The control and indicating circuit 34 is energized from a 120 volt, 60 cycle source via a 5 ampere fuse FU1 and a series connected switch SW1. A first branch of the control and indicating circuit 34 includes a white pilot light 35 which, when lit, simply indicates that the circuit 34 is energized. A second branch of the circuit 34 includes relay contacts CC1C connected in series with an audible alarm device 36, which is permanently connected in parallel with a red pilot light 37.

A third branch of the control and indicating circuit 34 includes a single-pole, double-throw switch SW2 which is mechanically ganged to the contacts 17, 18, 25 and 26 of the circuit breaker CB1. Whenever the circuit breaker CB1 is closed as illustrated, the switch SW2 contacts its first pole 38. The pole 38 is connected to one terminal of this alternating current relay CC1 via relay contact CR2B, which is connected in parallel with the contacts 39 of the reset pushbutton and may be closed by a reset button bar 33B. The reset button bar 33B is mechanically connected to the reset button bar 33A so that they may be jointly operated. The reset button bar 33A effects the opening of the contacts 32 simultaneously with the closing of the contacts 39 associated with the reset button bar 33B. The alternating current relay CR2 is connected to the pole 38 of the single-pole, double-throw switch SW2 via a series circuit which includes relay contact CR1A and CR2B. An additional red pilot light 40 is connected from one side of the alternating current power supply to a second pole 41 of the switch SW2.

OPERATION

Let it be assumed that the circuit breaker CB1 is so positioned that its contacts 17, 18, 25 and 26 are closed and that all switches, relay contacts and reset button bars are in the positions shown in the drawing. The closing of the contacts 17, 18, 25 and 26 of breaker CB1 does not of itself effect either the grounding of the tie bus 10 or the energization of the voltage responsive circuit 29. This is the case because the relay contacts CC1A, CC1B and CR2A are open.

In order to place the circuit in an operative condition, it is necessary to energize the control and indicating circuit 34 by firstly closing the switch SW1. When the switch SW1 is closed, the white pilot light 35 becomes energized, indicating that the circuit 34 is in a ready condition. Because of the fact that the relay contact CC1C is initially closed, and the audible alarm device 36 and the red pilot light 37 are energized, indicating that the grounding circuit for the tie bus 10 is still open.

To effect completion of the series grounding circuit from the tie bus 10 to the grounding rods 21-23 and to place the voltage sensing circuit 29 into operation, the reset pushbutton is depressed, the reset button bar 33B closes its associated contacts 39 thereby energizing the relay CC1 and, via the initially closed relay contact CR1A, the relay CR2. The thus activated relay CR2 closes its associated relay contact CR2A which completes the connection of the direct current relay CR1 in the voltage responsive circuit 29. The activation of the relay CR2 also effects the closure of its associated relay contact CR2B which provides a holding current path for itself and for the relay CC1.

The thus energized relay CC1 effects the closing of the relay contacts CC1A and CC1B thereby completing the series circuit between the tie bus 10 and the grounding rods 21-23 and, at the same time, opens the relay contact CC1C thereby interrupting the flow of current to the audible alarm device 36 and the pilot light 37.

The de-energizing of the device 36 and light 37 indicates that the grounding circuit from the tie bus 10 to the grounding rods 21-23 has been completed and remains conductive.

If no fault occurs in the direct current power supply system of the processing facility and electrical storm conditions do not unexpectedly result in the raising of the static charge on the direct current supply system to a high level, the thus established conditions of the control and indicating circuit 34 and the voltage responsive circuit 29 would prevail.

In the event that the direct current power supply system becomes unbalanced because of a circuit or cell fault or a short, for example, the voltage between the tie bus 10 and the plant ground grid 16 may rise to such a level that it exceeds about 20 volts. Under these conditions, current of sufficient magnitude to activate the relay CR1 will flow through the relay CR1, in one direction or another depending on polarity, thereby opening its associated relay contact CR1A with the consequent de-energization of the relay CR2. When the relay CR2 becomes de-energized, its associated contacts CR2A and CR2B open. The opening of the contact CR2A effectively interrupts current flow through the relay CR1, consequently, protecting the voltage sensing circuit 29. The opening of the relay contact CR2B results in the de-energization of the relay CC1, its associated contact CC1C is consequently closed, re-energizing the alarm device 36 and the red pilot light 37 signaling to an operator that a fault exists. At the same time, the de-energization of the relay CC1 opens the relay contacts CC1A and CC1B interrupting the grounding circuit between the tie bus 10 and the ground rods 21-23. The circuit breaker CB1 remains in its initially contact closed condition and the switch SW2, which is ganged to the circuit breaker CB1, remains in its illustrated position. The red pilot light 40 remains de-energized. An operator can thus tell that the fault is that of an over-voltage between the tie bus 10 and the plant ground grid, because the red pilot light 37 is lit while the red pilot light 40 is not lit.

Two other possible faults can take place to which the circuit of the present invention will respond. The first of these is that too great a current may flow between the tie bus 10 and the grounding rods 21-23. If this particular current exceeds 1.75 amperes, the overload actuators 19 and 20 effect the opening of the circuit breaker CB1. Since the switch SW2 is mechanically ganged to the contacts 17, 18, 25 and 26 of the circuit breaker CB1, it is moved so that its second pole 41 contacts its operative member thereby energizing the red pilot light 40 indicating either that too great a current is flowing between earth ground and the tie bus 10, or that an unacceptable magnitude of current is flowing between the ground grid 16 and the tie bus 10. The relays CC1 and CR2 are de-energized again opening their associated contacts CC1A, CC1B and CR2A and closing the contact CC1C. The circuit will remain in the just described condition, with the alarm device 36 and both of the red pilot lights 37 and 40 on, until the circuit breaker CB1 is positioned so that to close its associated contacts 17, 18, 25 and 26 which would return the switch SW2 to its illustrated position without re-establishing the series circuit between the tie bus 10 and the grounding rods 21-23 and the tie bus 10 and the plant ground grid 16. As stated earlier, these circuits can be completed only by momentarily depressing the reset button bars 33A and 33B.

While a single embodiment of the present invention has been shown and described for purposes of illustration, it is to be understood that various changes in the details of construction and in the arrangment of parts and in the substitution of equivalents may be made without departing from the spirit and scope of the invention, its scope being defined by the appended claims.

What is claimed is:

1. A lightning protection, earth grounding circuit in circuit with an aluminum reduction plant having a direct current power system, the circuit comprising a floating direct current neutral point in said direct current power system, at least one grounding rod electrically and mechanically connected to earth ground and a direct current series circuit connected between said grounding rod and said floating direct current neutral point for effecting leaking to earth of static charges which may build up to high potential levels during electrical storm conditions and the like, said aluminum reduction plant having at least one pot line, composed of a plurality of series connected reduction cells, and wherein said floating neutral point is a point between two adjacent ones of said cells, a substantially equal number of said cells being connected between said point and respective poles of said power system.

2. A circuit according to claim 1, wherein said series circuit between earth ground and said floating neutral point includes circuit breaker means responsive to current flow between said earth ground and said floating neutral point for opening said series circuit upon occurrence therein of a current in excess of a predetermined magnitude.

3. A circuit according to claim 1, further including a facility ground, a voltage responsive circuit coupled between said floating neutral point and said facility ground for effecting opening of said series circuit to earth ground upon occurrence of a voltage in excess of a predetermined magnitude between said facility ground and said floating neutral point.

4. A circuit according to claim 3, further including further circuit breaker means coupled between said floating neutral point and said facility ground via said voltage responsive circuit for effecting opening of said series circuit upon occurrence of a current in excess of a given magnitude between said facility ground and said floating neutral point.

5. A circuit according to claim 4, wherein said facility ground comprises a plant ground grid buried in the earth.

6. A circuit according to claim 1, including a facility ground and circuit breaker means connected in circuit between said floating neutral point and said facility ground for effecting opening of said series circuit upon occurrence of a current in excess of a given magnitude between said facility ground and said floating neutral point.

* * * * *